United States Patent [19]

Hamada et al.

[11] 4,401,500

[45] Aug. 30, 1983

[54] PRIMER COMPOSITION USED FOR ADHESION

[75] Inventors: Mitsuo Hamada, Kisaratsu; Sadami Yasuda, Ichihara, both of Japan

[73] Assignee: Dow Corning Corporation, Midland, Mich.

[21] Appl. No.: 352,507

[22] Filed: Feb. 25, 1982

[30] Foreign Application Priority Data

Mar. 27, 1981 [JP] Japan .................................. 56-44781

[51] Int. Cl.$^3$ .............................................. C09J 5/02
[52] U.S. Cl. ............................ 156/307.5; 106/287.11; 106/287.14; 106/287.15; 106/287.16; 156/314; 156/326; 156/329; 427/409; 428/447; 524/588
[58] Field of Search .................... 156/314, 326, 307.5, 156/329; 427/409; 106/287.11, 287.14, 287.15, 287.16; 428/447; 524/588

[56] References Cited

U.S. PATENT DOCUMENTS

| | | | |
|---|---|---|---|
| 3,849,148 | 11/1974 | Temple | 106/287.15 |
| 4,059,473 | 11/1977 | Okami | 156/314 |
| 4,133,938 | 1/1979 | Bingham | 156/314 |

FOREIGN PATENT DOCUMENTS

| | | |
|---|---|---|
| 49-5730 | 2/1974 | Japan . |
| 50-35530 | 11/1975 | Japan . |
| 1288268 | 9/1972 | United Kingdom . |
| 1288269 | 9/1972 | United Kingdom . |

*Primary Examiner*—John J. Gallagher
*Attorney, Agent, or Firm*—Roger H. Borrousch

[57] ABSTRACT

A mixture of an alkoxy containing silicon compound, a hydroperoxide, and organic solvent is a primer composition useful for bonding heat curing silicone rubber, especially fluorosilicone rubber, to a substrate.

17 Claims, No Drawings

PRIMER COMPOSITION USED FOR ADHESION

BACKGROUND OF THE INVENTION

1. Field of the Invention

The present invention relates to a primer composition which has excellent adhesive properties. More specifically, it relates to a primer composition suited to adhering silicone rubber of the heat-curing type, particularly fluorosilicone rubber, to various types of substrates, such as metal surfaces.

2. Description of the Prior Art

Fan and Show in Japanese Patent Publication No. Sho 49[1974]-5730 have described using vinyl-tris(tert-butylperoxy)silane as a primer for adhering EPDM, EPR, chlorinated polyethylene, or silicone rubber to surfaces of glass and metal. However, this primer exhibits drawbacks such as the necessity of long-term heat treatment at an elevated temperature and pressure. For this reason, Maizumi and Inoue in Japanese Patent No. Sho 50[1975]-35,530, published Nov. 17, 1975, describes an adhesive primer composition which can be used as a primer for attaching thermoplastic resins to each other or attaching thermoplastic resin to glass, metals, or metal oxides at low temperatures in a short period of time. The primer composition of Maizumi and Inoue is composed of vinyltris(tertiary-butylperoxy)silane, an organoperoxide whose half-life is 1 minute at 130°–190° C., and an inert organic solvent. However, this primer composition of Maizumi and Inoue exhibits slow air-drying and slow thermosetting properties after it has been coated over with a material to be attached. Therefore, the primer layer coated on the material surface moves from one location to another location by press insertion of material during injection- or press-molding processes. For this reason, this primer composition of Maizume and Inoue exhibits not only drawbacks such as difficulty in achieving uniform adhesion, but also the drawback of interfacial delamination which can be detected by inspection of the adhesion properties of silicone rubber, especially fluorosilicone rubber as a material to be attached. For this reason, this primer composition of Maizumi and Inoue is unsatisfactory for attaching silicone rubber to a substrate, especially for attaching fluorosilicone rubber to a substrate.

As a result of extensive investigations to improve the above-mentioned drawbacks, the present inventors were able to perfect a primer composition which air dries and cures well, with which an adhesion effect is obtained by thermocompression bonding at comparatively low temperatures and in a short period of time, and which is effective in adhering silicone rubber to a substrate, particularly in adhering fluorosilicone rubber to a substrate. We discovered, as described in our co-pending application Ser. No. 308,335, filed Oct. 5, 1981, entitled "An Adhesive Primer Composition," that using a primer composition comprising a mixture of an organosilicon compound having at least one alkoxy or alkoxyalkoxy radical per molecule, vinyltris(tertiary-butylperoxy)silane, and organic solvent was an excellent primer which overcame the drawbacks. We have now made a further discovery which allows up to make a primer composition, equally as good as our primer composition described in Ser. No. 308,335, without having to make the vinyltris(tertiary-butylperoxy)silane and therefore a less expensive primer composition is obtained.

SUMMARY OF THE INVENTION

This invention relates to a primer composition for adhering silicon rubber to a substrate consisting essentially of (A) 100 parts by weight of an alkoxy containing silicon compound selected from the group consisting of an alkoxysilane represented by the formula

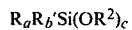

$R_a R_b' Si(OR^2)_c$ wherein R is a monovalent radical selected from the group consisting of alkyl radicals, halogenated alkyl radicals, and aryl radicals; R' is a monovalent radical selected from the group consisting of alkenyl radicals and $XR^3$- radicals in which X is a monovalent radical selected from the group consisting of acryloxy radical, methacryloxy radical, N-aminoalkylamino radical, amino radical, N-alkylamino radical, epoxy radical, and mercapto radical, and $R^3$ is a divalent radical selected from the group consisting of hydrocarbon radicals, halogenated hydrocarbon radicals, hydroxyhydrocarbon radicals and ether radicals; $R^2$ is an alkyl radical or an alkoxyalkyl radical; a has a value of 0 to 2 inclusive; b has a value of 0 to 2 inclusive; c has a value of 2 to 4 inclusive; the sum of a+b+c is 4; and partial hydrolysis condensates of at least one alkoxysilane defined above where said condensate contains at least two alkoxy radicals per molecule, (B) from 0.5 to 50 parts by weight of a hydroperoxide, and (C) an organic solvent.

DESCRIPTION OF THE INVENTION

The alkoxy containing silicon compound of (A) can be an alkoxysilane or a partial hydrolysis condensate of at least one of the alkoxysilanes. The alkoxysilanes are tetraalkoxysilanes, organotrialkoxysilanes, or diorganodialkoxysilanes, which can be expressed by the general formula

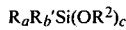

$R_a R_b' Si(OR^2)_c$ where R is an alkyl radical such as methyl, ethyl, propyl, or octyl; a halogenated alkyl radical such as 3,3,3-trifluoropropyl; or an aryl radical such as phenyl. R' is an alkenyl radical such as vinyl or allyl; or a radical represented by $XR^3$- where X is a monovalent radical selected from acryloxy radical, methacryloxy radical, N-aminoalkylamino radical, amino radical, N-alkylamino radical, epoxy radical, and mercapto radical; and $R^3$ is a divalent radical selected from divalent hydrocarbon radicals such as methylene, ethylene, propylene, and phenylene, divalent halogenated hydrocarbon radicals such as chloroethylene and fluoroethylene, divalent hydroxyhydrocarbon radicals, and divalent ether radicals such as —CH$_2$OCH$_2$CH$_2$CH$_2$—, —CH$_2$CH$_2$OCH$_2$CH$_2$—,

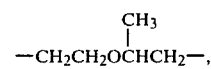

$$-CH_2CH_2O\overset{\underset{\displaystyle CH_3}{|}}{C}HCH_2-,$$

and —CH$_2$OCH$_2$CH$_2$OCH$_2$—.

$R^2$ is an alkyl radical such as methyl, ethyl, propyl, butyl, pentyl, octyl, and decyl or an alkoxyalkyl radical such as beta-methoxyethyl. In the alkoxysilane, a can be 0, 1, or 2; b can be 0, 1, or 2; c can be 2, 3, or 4; and the sum of a+b+c is 4. Mixtures of the alkoxysilanes can be used.

The partial hydrolysis condensate of the alkoxysilanes are siloxanes which can be straight chain, ring structure, branched chain, three-dimensional structures, or mixtures of these structures. The partial hydrolysis condensate is made by partially hydrolyzing one or more of the alkoxysilanes such that there is at least two alkoxy radicals per molecule in the resulting condensate. The condensate is usually a liquid at normal temperatures.

The preferred alkoxy containing silicon compounds of (A) are alkoxysilanes of the formula

and partial hydrolysis condensates with one or more R' radicals and 3 or more alkoxy radicals per molecule. These preferred (A) in the primer compositions of this invention exhibit the best combination of adhesive properties and air dryability.

Examples of alkoxysilanes of (A) include vinyltrimethoxysilane, methylvinyldimethoxysilane, vinyltriethoxysilane, vinyl-tris(β-methoxyethoxy)silane, γ-methacryloxypropyltrimethoxysilane, γ-methacryloxypropylmethyldimethoxysilane, γ-methacryloxypropyltriethoxysilane, γ-acryloxypropyltriethoxysilane, allyltrimethoxysilane, allyltriethoxysilane, allylmethyldiethoxysilane, γ-mercaptopropyltrimethoxysilane, γ-mercaptopropylmethyldimethoxysilane, N-β-(aminoethyl)-γ-aminopropyltrimethoxysilane, γ-aminopropyltriethoxysilane, γ-aminopropylmethyldiethoxysilane, γ-mecaptopropyltriethoxysilane, mercaptoethyltriethoxysilane, γ-aminopropyltrimethoxysilane, γ-glycidoxypropyltrimethoxysilane, γ-glycidoxypropylmethyldimethoxysilane, β-(3,4-epoxycyclohexyl)ethyltrimethoxysilane, tetramethoxysilane, tetraethoxysilane, tetrapropoxysilane, and tetrabutoxysilane.

The hydroperoxide of component (B) used in the present invention is represented by hydrogen peroxide, methyl hydroperoxide, ethyl hydroperoxide, n-butyl hydroperoxide, 2,4,4-trimethylpentyl-2-hydroperoxide, diisopropylbenzene hydroperoxide, cumene hydroperoxide, t-butyl hydroperoxide, cyclohexyl hydroperoxide, and 2-methyl-2-cyclohexen-1-yl hydroperoxide. Component (B) is limited to hydroperoxides because organic peroxides such as ketone peroxides, diacyl peroxides, dialkyl peroxides, peroxyketals, alkyl peresters, and percarbonates do not provide adequate adhesive force when present with component (A). Component (B) is an essential component in order to further improve the adhesive force when component (A) is also present. The mixing ratio is 0.5-50 parts by weight, preferably 5-30 parts by weight with respect to 100 parts by weight of component (A). When this mixing ratio is less than 0.5 part by weight, a strong adhesive force is not obtained; when it is more than 50 parts by weight, a decline is brought about in air dryability and adhesive strength.

The component (C) used in the present invention is an organic solvent for the purpose of dissolving the composition of the present invention, and it is selected with due consideration to solubility and to its vaporization properties when applied as a primer. Toluene, xylene, benzene, heptane, hexane, rubber solvent, and trichloroethylene, for example, can be mentioned, but it is not limited to these alone. One variety of organic solvent can be used, or a mixed solvent of two or more varieties can be used. The mixing ratio is not particularly limited because it is advantageous to adjust it to the viscosity suited to application as primer.

The composition of the present invention is easily obtained merely by uniformly mixing the above-mentioned components, (A), (B), and (C). But for purposes of improving the material properties of the coat after hardening, one can add various inorganic fillers; for example, fumed silica, precipitated silica, quartz micro powder, diatomaceous earth, calcium carbonate, red iron oxide, cerium oxide, titanium oxide, alumina, and carbon black, and also conventionally well-known heat resistant agents; coloring agents, and other additives, such as organic esters of titanic acid. Also, one or more varieties or organosilanes and organopolysiloxanes other than component (A) may be included.

When using the composition of the present invention, it is desirable to adhere the silicone rubber after the primer composition has air dried 30 minutes or longer following application to the substrate.

Examples of substrates include metals such as iron, aluminum, copper, zinc, stainless steel, brass, and bronze; plastics such as epoxy resins, vinyl chloride resins, polyester resins, and polyamide resins; and inorganic materials such as glass, mortar, and asbestos. Silicone rubber which is to be adhered to the substrate is obtained from a heat-curing silicone rubber composition whose principal ingredients are organic peroxides, fillers, and polymers, copolymers, or mixtures thereof, whose repeating units include dimethylsiloxane, methylphenylsiloxane, diphenylsiloxane, methylvinylsiloxane, phenylvinylsiloxane, 3,3,3-trifluoropropylmethylsiloxane, 3,3,3-trifluoropropylvinylsiloxane, and 3,3,3-trifluoropropylphenylsiloxane. In particular, the primer composition of the present invention is ideal for the adhesion of fluorosilicone rubber that contains fluorinated hydrocarbon groups such as 3,3,3-trifluoropropyl groups which are difficult to adhere with ordinary primers.

The composition of the present invention is especially useful as a primer and is also useful for the adhesion of silicone rubbers other than those mentioned above and for the adhesion of natural or synthetic rubbers to silicone rubber. In addition, it can be used as a coating agent, added to various rubbers, resins, baking paints, etc., as adhesion improvers, and can itself be used as an adhesive, curable material.

The following examples are presented for illustrative purposes only and should not be construed as limiting the present invention which is properly described in the claims. In the examples, "parts" indicates "parts by weight" and the viscosity is the value measured at 25° C.

EXAMPLE 1

Various primer compositions having the components and mixing ratios shown in Table I were prepared and applied respectively in a thin coat on metal plates of aluminum, phosphor bronze, and stainless steel and then left alone to air dry for 60 minutes at room temperature. Other than the ingredients shown in Table I, each of the primer compositions also contained 1000 parts of rubber solvent which is a naptha having a boiling point range of 43° C. to 140° C. A 4 mm thick unvulcanized molding of a fluorosilicone rubber composition (LS-422 base manufactured by Dow Corning Corporation, Midland, Michigan, U.S.A.), to which 0.5%, 2,5-dimethyl-2,5-di(t-butyl peroxide)hexane was added as cross-linking agent, was placed on the primed substrate surface and made to adhere to the metal plate while simultaneously curing the fluorosilicone rubber composition by heating it for 10 minutes at 170° C. under a pressure of 30 kg/cm². Then the adhesion state was examined by peeling apart the fluorosilicone rubber and metal plate. Also, the air drying situation 60 minutes after application of the primer to the metal plate was investigated. The ones judged dry to the touch were indicated by O and those judged sticky were indicated with an X. These results are shown in Table I.

TABLE I

| Experiment No. | The Present Invention | | Comparison Examples | | | | |
|---|---|---|---|---|---|---|---|
| | 1 | 2 | 1 | 2 | 3 | 4 | 5 |
| Components | | | | | | | |
| (A) Vinyltrimethoxylsilane (parts) | 100 | 100 | 100 | 100 | 100 | — | — |
| (B) 2,4,4-trimethylpentyl-2-hydroperoxide (parts) | 10 | 30 | — | — | — | — | — |
| 1,1-di-t-butylperoxy-3-3-5-trimethylcyclohexane (parts) | — | — | 30 | — | — | — | — |
| di-t-butyl peroxide (parts) | — | — | — | 40 | — | — | 50 |
| 2,4-dichlorobenzoyl peroxide (parts) | — | — | — | — | 15 | — | — |
| Vinyl-tris(t-butyl peroxide)silane (parts) | — | — | — | — | — | 100 | 100 |
| Adhesion state on substrate | | | | | | | |
| Aluminum, phosphor bronze, stainless steel | *** | *** | * | * | * | ** | * |
| Air dryability of primer | O | O | O | O | O | X | X |

*Interfacial peeling in each case
**Thin layer cohesive failure in each case
***100% cohesive failure in each case

EXAMPLE 2

Various primer compositions with the components and mixing ratios shown in Table II were prepared; the primer was applied using metal plates similar to those of Example 1 and dried for 60 minutes at room temperature. Other than the ingredients listed in Table II, each primer composition also contained 1000 parts of rubber solvent as defined in Example 1. A 4 mm thick unvulcanized molding of a dimethylsilicone rubber composition (SH-52U manufactured by Toray Silicone Co., Tokyo, Japan), to which 0.7% 2,4-dichlorobenzoyl peroxide was added as cross-linking agent, was placed on the primed substrate surface, and dimethylsilicone rubber was adhered to the metal plate by heating for 5 minutes at 120° C. at a pressure of 30 kg/cm². The adhesion state and air dryability of the primer were investigated in the same manner as Example 1, and the results are shown in Table II.

TABLE II

| Experiment No. | The Present Invention | | | | |
|---|---|---|---|---|---|
| | 3 | 4 | 5 | 6 | 7 |
| Components | | | | | |
| (A) N—β(aminoethyl-γ-aminopropyl)trimethoxysilane (parts) | 100 | — | — | — | — |
| γ-glycidoxypropyltrimethoxysilane (parts) | — | 100 | — | — | 50 |
| γ-methacryloxypropyltrimethoxysilane (parts) | — | — | 100 | — | 50 |
| γ-mercaptopropyltrimethoxysilane (parts) | — | — | — | 100 | — |
| (B) 2,4,4-trimethylpentyl-2-hydroperoxide (parts) | 15 | 20 | 25 | 20 | 5 |
| Adhesion state on substrate | | | | | |
| Aluminum, phosphor bronze, stainless steel | *** | *** | *** | *** | *** |
| Air dryability of primer | O | O | O | O | O |

***100% cohesive failure in each case

EXAMPLE 3

The adhesion state and air dryability of the primer composition shown in Table III (using 1000 parts toluene as organic solvent in each case) were investigated in the same manner as Example 1.

The results are shown in Table III. Excellent adhesive properties were exhibited in each case.

TABLE III

| Experiment No. | The Present Invention | |
|---|---|---|
| | 8 | 9 |
| Components | | |
| (A) $CH_2=CH-\underset{OC_2H_5}{\overset{CH_3}{Si}}-O-\underset{OC_2H_5}{\overset{CH_3}{Si}}-O-\underset{OC_2H_5}{\overset{CH_3}{Si}}-CH_3$ (parts) | 100 | — |
| Liquid organopolysiloxane resin (Note 1) (parts) | — | 100 |
| (B) Cumene hydroperoxide (parts) | 10 | 20 |
| Adhesion state on substrate | | |
| Aluminum, phosphor bronze, stainless steel | *** | *** |
| Air dryability of primer | O | O |

Note 1:
Liquid organopolysiloxane resin with a viscosity of 2 Pa.s, an alkoxy group content of 10% by weight, and obtained by hydrolysis of $CH_3Si(OCH_3)_3$ (60 mol %), $(CH_3)(CH_2=CH)Si(OC_2H_5)_2$ (30 mol %), and $(C_6H_5)_2Si(OCH_3)_2$ (10 mol %).
***100% cohesive failure in each case That which is claimed is:
1. A method for adhering silicon rubber to a substrate comprising coating the substrate with a primer composition, air drying the coating for at least 30 minutes to form a primer coated substrate, applying a heat curable silicone rubber composition over the primer coated substrate to make an assembly, heating the assembly to a temperature which cures the silicone rubber composition, and a silicone rubber bonded to the substrate is obtained, said primer composition consisting essentially of
(A) 100 parts by weight of an alkoxy containing silicon compound selected from the group consisting of an alkoxysilane represented by the formula $R_aR'_bSi(OR^2)_c$ wherein R is a monovalent radical selected from the group consisting of alkyl radicals, halogenated alkyl radicals, and aryl radicals; R' is a monovalent radical selected from the group consisting of alkenyl radicals and $XR^3$- radicals in which X is a monovalent radical selected from the group consisting of acryloxy radical, methacryloxy radical, N-aminoalkylamino radical, amino radical, N-alkylamino radical, epoxy radical, and mercapto radical, and $R^3$ is a divalent radical selected from the group consisting of hydrocarbon radicals, halogenated hydrocarbon radicals, hydroxyhydrocarbon radicals and ether radicals; $R^2$ is an alkyl radical or an alkoxyalkyl radical; a has a value of 0 to 2 inclusive; b has a value of 0 to 2 inclusive; c has a value of 2 to 4 inclusive; the sum of a+b+c is 4; and partial hydrolysis condensates of at least one alkoxysilane defined above where said condensate contains at least two alkoxy radicals per molecule,
(B) from 0.5 to 50 parts by weight of a hydroperoxide, and
(C) an organic solvent.

2. The method in accordance with claim 1 in which the silicone rubber composition is a fluorosilicone rubber composition.

3. A primer composition for adhering silicone rubber to a substrate consisting essentially of
(A) 100 parts by weight of an alkoxy containing silicon compound selected from the group consisting of an alkoxysilane represented by the formula $R_aR'_bSi(OR^2)_c$ wherein R is a monovalent radical selected from the group consisting of alkyl radicals, halogenated alkyl radicals, and aryl radicals; R' is a monovalent radical selected from the group consisting of alkenyl radicals and $XR^3$- radicals in which X is a monovalent radical selected from the group consisting of acryloxy radical, methacryloxy radical, N-aminoalkylamino radical, amino radical, N-alkylamino radical, epoxy radical, and mercapto radical, and $R^3$ is a divalent radical selected from the group consisting of hydrocarbon radicals, halogenated hydrocarbon radicals, hydroxyhdrocarbon radicals and ether radicals; $R^2$ is an alkyl radical or an alkoxyalkyl radical; a has a value of 0 to 2 inclusive; b has a value of 0 to 2 inclusive; c has a value of 2 to 4 inclusive; the sum of a+b+c is 4; and partial hydrolysis condensates of at least one alkoxysilane defined above where said condensate contains at least two alkoxy radicals per molecule,
(B) from 0.5 to 50 parts by weight of a hydroperoxide, and
(C) an organic solvent.

4. The primer composition according to claim 1 in which the alkoxy containing silicon compound is an alkoxysilane.

5. The primer composition according to claim 2 in which a is 0, b is 1, and c is 3.

6. The primer composition according to claim 3 in which the alkoxysilane is vinyltrimethoxysilane.

7. The primer composition according to claim 3 in which the alkoxysilane is N-beta(aminoethyl-gamma-aminopropyl)trimethoxysilane.

8. The primer composition according to claim 3 in which the alkoxysilane is gamma-glycidoxypropyltrimethoxysilane.

9. The primer composition according to claim 3 in which the alkoxysilane is gamma-methacryloxypropyltrimethoxysilane.

10. The primer composition according to claim 3 in which the alkoxysilane is gamma-mercaptopropyltrimethoxysilane.

11. The primer composition according to claim 1, 2, 3, 4, 5, 6, 7, or 8 in which the hydroperoxide is selected from 2,4,4-trimethylpentyl-2-hydroperoxide and cumene hydroperoxide.

12. The primer composition according to claim 9 in which the hydroperoxide is present in an amount of 5 to 30 parts by weight.

13. The primer composition according to claim 1 in which the alkoxy containing silicon compound is the partial hydrolysis condensate.

14. The primer composition according to claim 13 in which the condensate is a siloxane of the formula

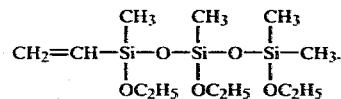

15. The primer composition according to claim 14 in which the hydroperoxide is cumene hydroperoxide.

16. The primer composition according to claim 13 in which the condensate is a liquid organopolysiloxane resin having a viscosity of 2 Pa.s, an alkoxy content of 10 percent by weight, and obtained by the partial hydrolysis of a mixture composed of 60 mol percent methyltrimethoxysilane, 30 mol percent methylvinyldiethoxysilane, and 10 mol percent diphenyldimethoxysilane.

17. The primer composition according to claim 16 in which the hydroperoxide in cumene hydroperoxide.

* * * * *

UNITED STATES PATENT AND TRADEMARK OFFICE
CERTIFICATE OF CORRECTION

PATENT NO. : 4,401,500
DATED : August 30, 1983
INVENTOR(S) : Mitsuo Hamada and Sadami Yasuda It is certified that error appears in the above—identified patent and that said Letters Patent is hereby corrected as shown below:

On the title page:
[73] Assignee - Reads "Dow Corning Corporation, Midland, Mich." should read "Toray Silicone Company, Ltd., Tokyo, Japan"

Column 1, line 63 - the word "up" should read "us"

Signed and Sealed this

Third Day of April 1984

[SEAL]

Attest:

Attesting Officer

GERALD J. MOSSINGHOFF

Commissioner of Patents and Trademarks